(12) United States Patent
Nagashima et al.

(10) Patent No.: US 6,994,154 B2
(45) Date of Patent: Feb. 7, 2006

(54) ALUMINUM HEAT EXCHANGER

(75) Inventors: Hisao Nagashima, Okazaki (JP); Junji Otobe, Okazaki (JP); Katsuya Ishii, Nagoya (JP)

(73) Assignee: DENSO Corporation, Kariya (JP)

( * ) Notice: Subject to any disclaimer, the term of this patent is extended or adjusted under 35 U.S.C. 154(b) by 109 days.

(21) Appl. No.: 10/819,239

(22) Filed: Apr. 6, 2004

(65) Prior Publication Data

US 2004/0200603 A1    Oct. 14, 2004

(51) Int. Cl.
*F28F 19/00* (2006.01)

(52) U.S. Cl. .............. 165/134.1; 165/133; 165/104.21
(58) Field of Classification Search ............ 165/133, 165/134.1, 62, 63, 104, 21; 62/474, 475, 62/478

See application file for complete search history.

(56) References Cited

U.S. PATENT DOCUMENTS

| | | | | |
|---|---|---|---|---|
| 4,346,184 A | * | 8/1982 | Drake | 523/451 |
| 4,408,655 A | * | 10/1983 | Hashimoto et al. | 165/104.27 |
| 4,487,036 A | * | 12/1984 | Itoh et al. | 62/474 |
| 4,548,258 A | * | 10/1985 | Nelson et al. | 165/104.21 |
| 6,004,476 A | * | 12/1999 | Verma et al. | 252/69 |
| 6,422,033 B2 | * | 7/2002 | Ishikawa et al. | 62/475 |

FOREIGN PATENT DOCUMENTS

| | | | |
|---|---|---|---|
| JP | 2001-124435 | | 5/2001 |
| JP | 2001244395 A | * | 9/2001 |

* cited by examiner

Primary Examiner—Tho Van Duong
(74) Attorney, Agent, or Firm—Harness, Dickey & Pierce, PLC

(57) ABSTRACT

In an adsorber for an adsorption type refrigerator of the present invention, aluminum heat exchangers 120, 130 arranged in a casing 110 are provided with films which do not permit moisture to pass therethrough, such as $SiO_3$ films, anodic oxide coating films and several ppm to a hundred and several tens of ppm of inorganic negative ions such as $PO_4^{3-}$, $SiO_3^{2-}$ are added in the water enclosed in the casing.

6 Claims, 9 Drawing Sheets

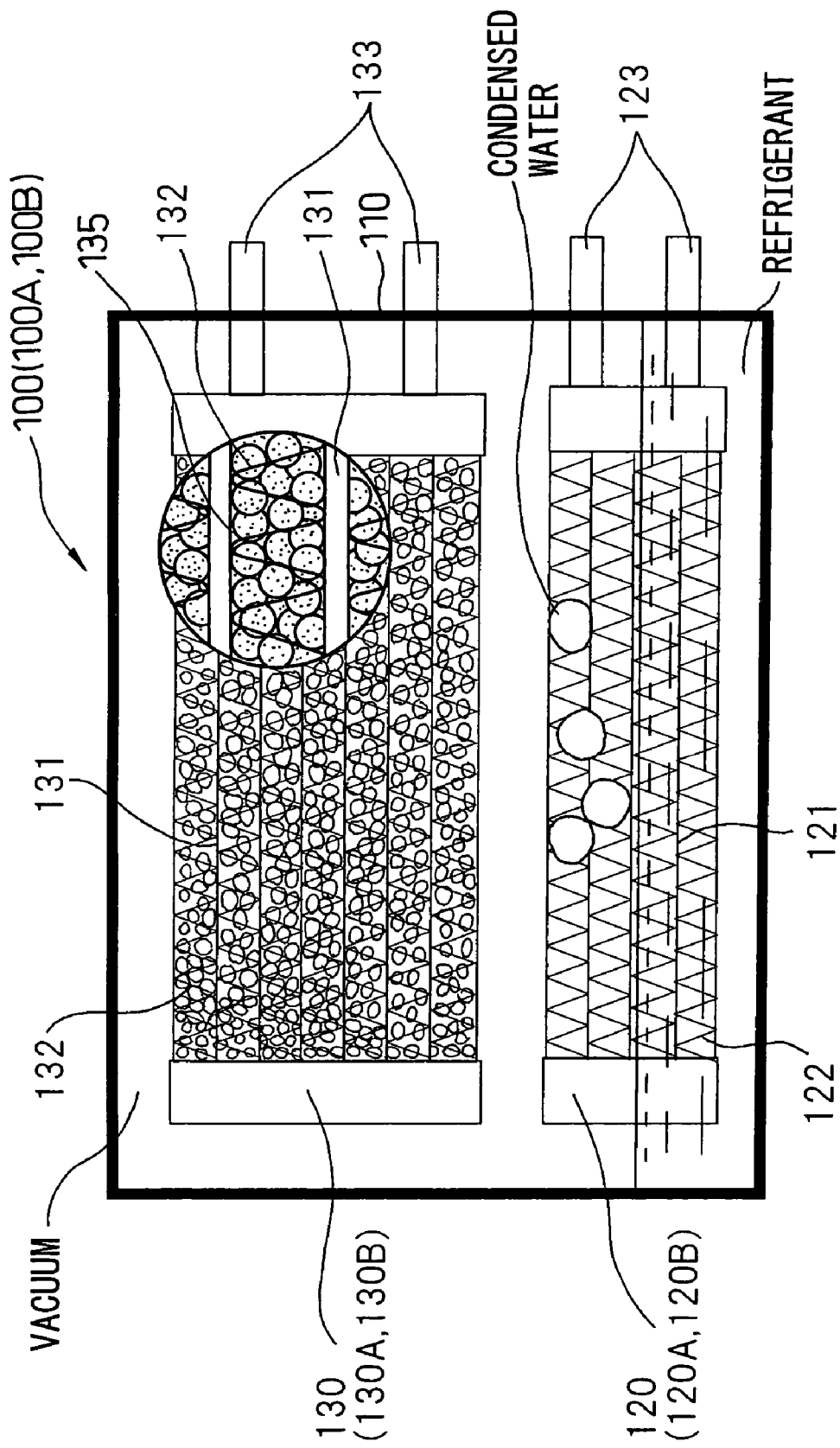

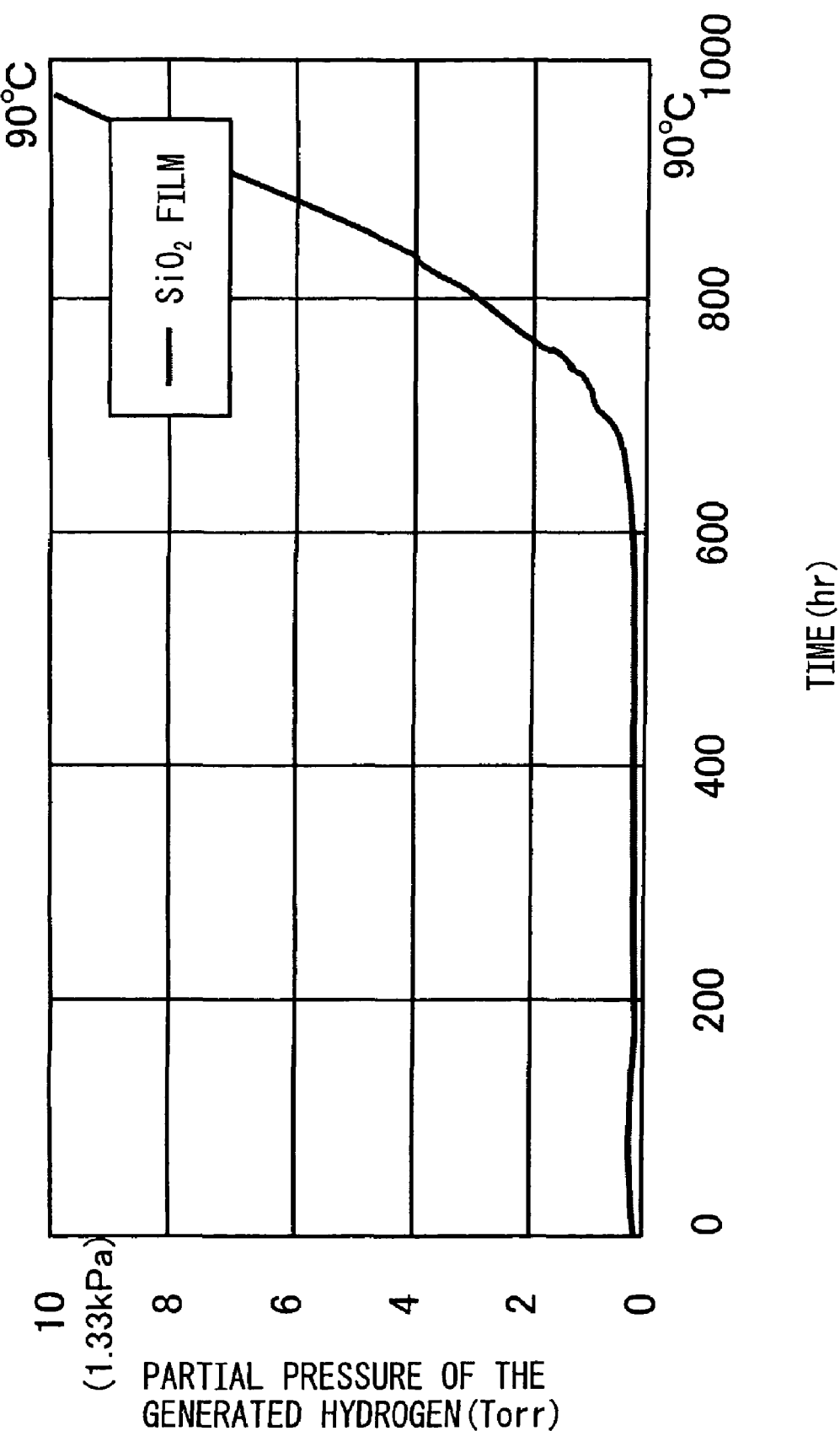

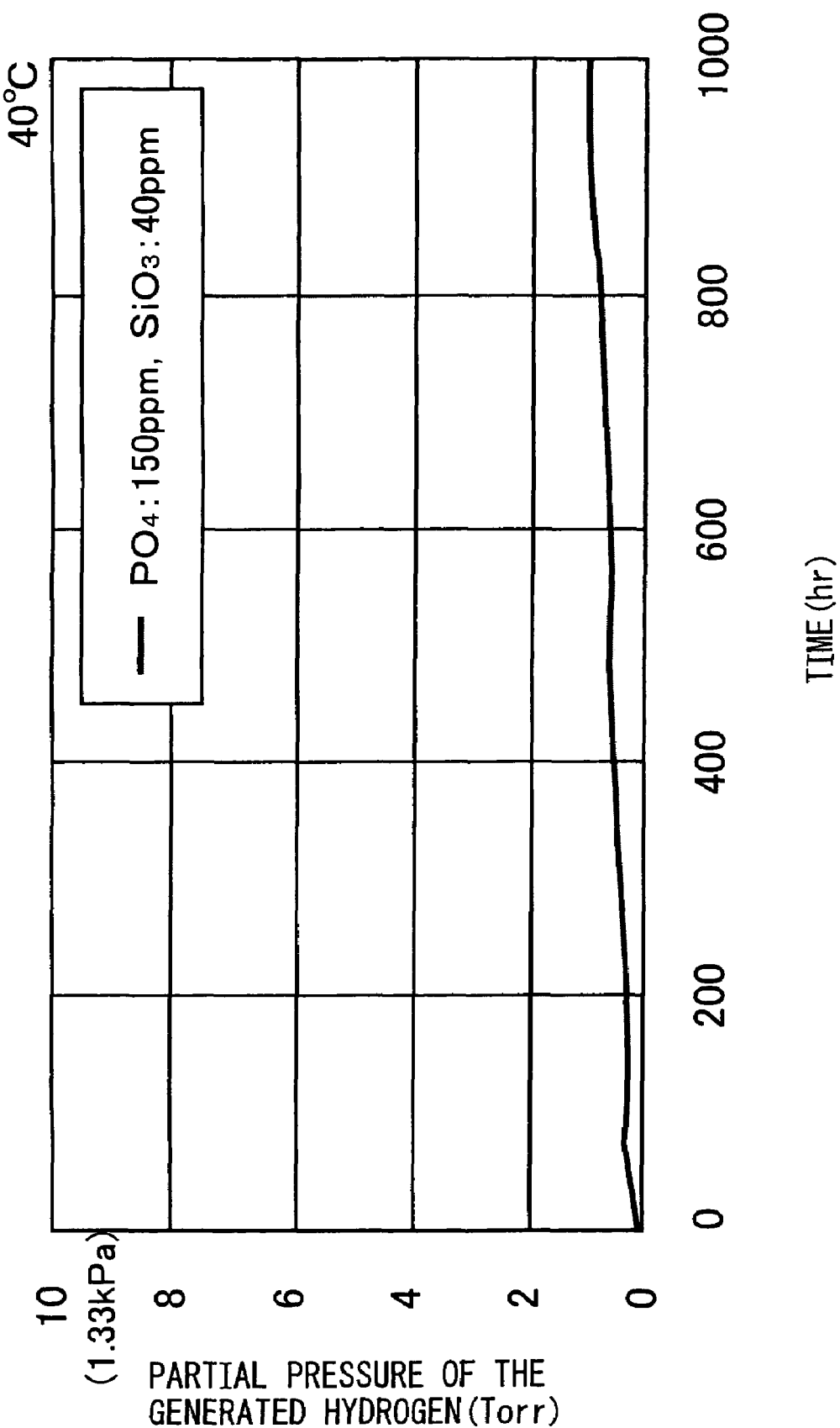

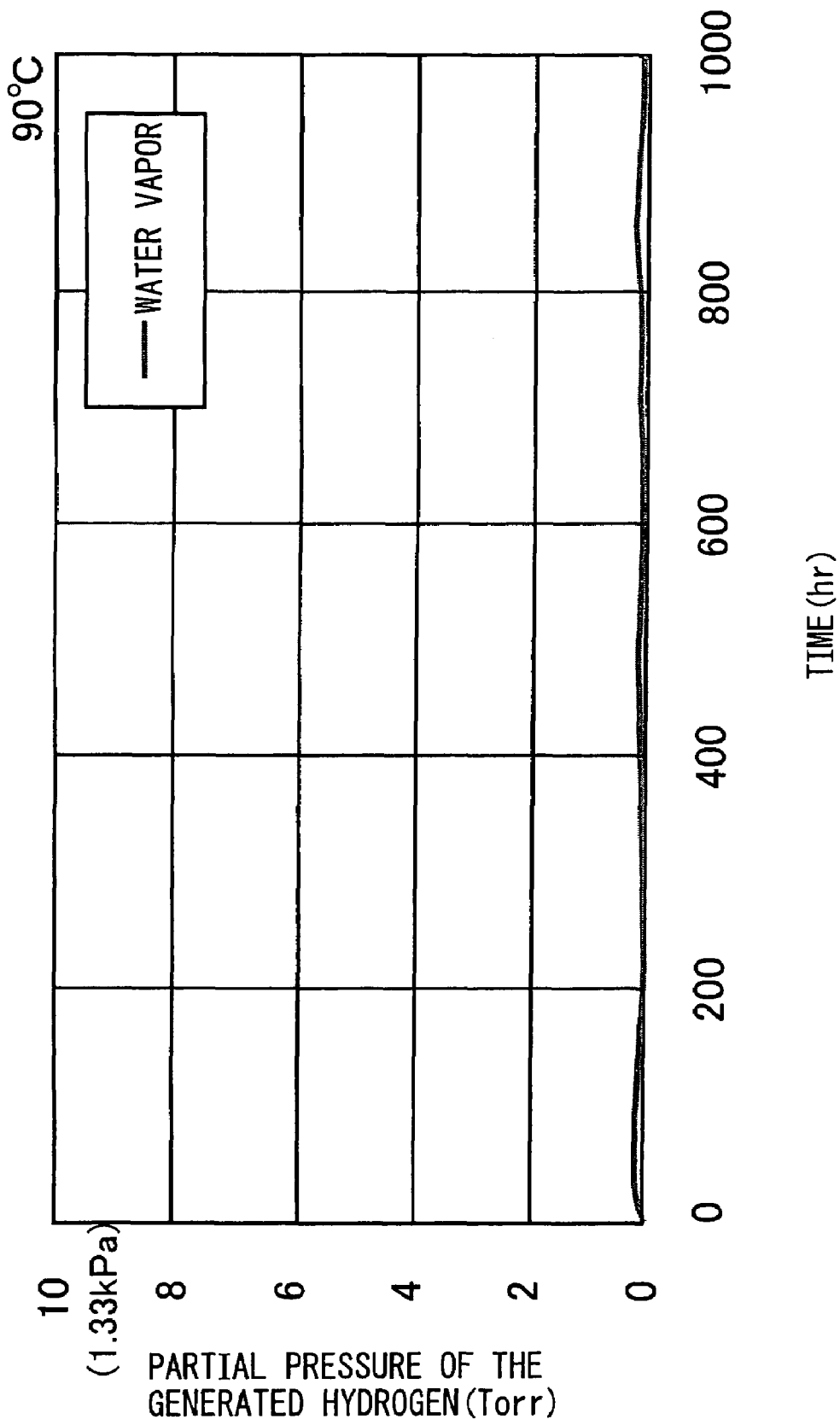

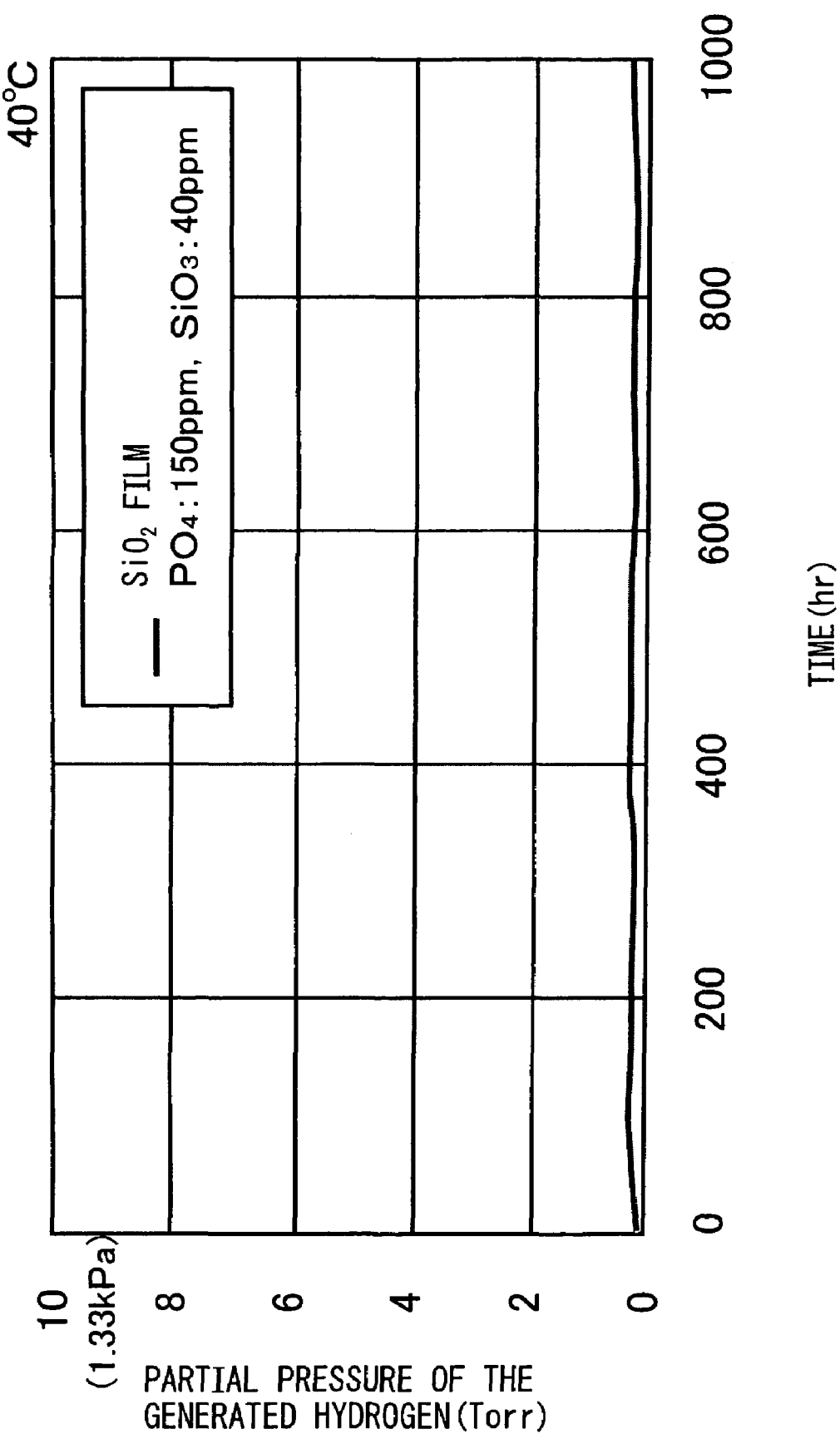

ALUMINUM HEAT EXCHANGER

FIELD OF THE INVENTION

The present invention relates to an aluminum heat exchanger which can be used as an adsorber for use with, for instance, an adsorption type refrigerator or a heat pipe.

DESCRIPTION OF THE RELATED ART

An adsorption type refrigerator utilizes a function of an adsorbent, such as zeolite or silica gel, to adsorb water vapor, wherein refrigerating power is obtained by cooling a liquid-phase refrigerant, such as water, enclosed in a substantially evacuated casing, due to a heat of evaporation (latent heat of evaporation) which is generated when the liquid is adsorbed. Hereinafter, an adsorber in which evaporation of the liquid-phase refrigerant and adsorption of the vapor-phase refrigerant occur will be referred to as an adsorber in an adsorption process.

For example, when the entirety of the liquid-phase refrigerant is evaporated, or, the adsorption ability of the adsorber is saturated (the adsorption amount has reached the limit), so that the pressure in the casing is increased and that the evaporation of the liquid-phase refrigerant stops, the adsorbent is heated to desorb the adsorbed vapor-phase refrigerant (water vapor) from the adsorbent (this will be referred to as regeneration of the adsorbent hereinafter) and the desorbed vapor-phase refrigerant is cooled and condensed (liquefied). Hereinafter, the adsorber in which the regeneration of the adsorbent and the condensation of the vapor-phase refrigerant take place will be referred to as an adsorber in a desorption process.

As described above, in the adsorber, cooling of the liquid-phase refrigerant by adsorption, heating of the adsorbent, recovering of the generated refrigerating ability and the like are carried out. To this end, a heat exchanger for these operations is provided in the casing. In general, a metal, such as aluminum, having high heat conductivity and good machinability is used for the material of the heat exchanger.

In this connection, if the refrigerant is water ($H_2O$) and the heat exchanger is made of aluminum, the aluminum (Al) chemically reacts with the water to produce hydrogen gas ($H_2$) because the aluminum has a stronger ionization tendency than hydrogen (H) in the refrigerant. If hydrogen is generated, hydrogen gas, which is not condensed, remains in pores of the adsorbent. Consequently, the water vapor cannot be adsorbed and thus, the adsorption ability of the adsorbent is decreased. Accordingly, the amount of evaporation of the refrigerant is reduced thus leading to reduction of the refrigerating ability.

Therefore, in general, a gas, such as hydrogen gas, which is not condensed (non-condensable gas) in the casing, is periodically discharged by a vacuum pump to maintain the casing vacuum. However, equipment, such as a vacuum pump, must be additionally provided to discharge the non-condensable gas such as hydrogen gas generated in the casing out of the adsorber. The provision of additional equipment increases the manufacturing cost and the size and weight of the devices, and reduces the performance.

Under these circumstances, the applicant of the present invention has proposed to provide a film which does not permit moisture to pass therethrough, on a surface of a heat exchanger in the casing in order to prevent generation of a non-condensable gas such as hydrogen gas, in the casing (See Japanese Unexamined Patent Publication No. 2001-124435).

However, in the adsorber of the prior art, it is very difficult to form on the heat exchanger a film which perfectly prevents generation of hydrogen, i.e., a film which can perfectly intercept the water. Also, it is difficult to conduct an inspection to prove that the film provided on the surface of the heat exchanger is perfect.

SUMMARY OF THE INVENTION

The present invention has been completed in consideration of the above problems and is aimed to provide an aluminum heat exchanger in which no inspection of a film formed on a heat exchanger surface in contact with water is necessary, and it is possible to certainly prevent generation of hydrogen.

In an aluminum heat exchanger of the present invention, a film which does not permit moisture to pass therethrough is formed on the surface of the aluminum heat exchanger arranged in a casing, and several ppm to a hundred and several tens ppm of inorganic oxide negative ions are added solely or in combination to the refrigerant enclosed in the casing. With this structure, in an aluminum heat exchanger arranged in the casing, as a matter of cause, no aluminum is released from the portion which is always in contact with the vaporized refrigerant (water vapor). Regarding the portion coated with the film, which is periodically in contact with the refrigerant (water) and the vaporized refrigerant (water vapor), it takes long time for the refrigerant (water) which has permeated through flaws of the film to reach the surface of the aluminum, due to the film formed on the aluminum surface. Therefore, if the refrigerant is transformed into the vapor (water vapor) before it reaches the aluminum surface, no hydrogen gas is generated. Regarding the portion which is always in contact with the refrigerant (water), the negative ions in the refrigerant repair the flaws of the film, so that the generation of the hydrogen can be certainly prevented.

In an embodiment of the present invention, the aluminum heat exchanger can be applied to an adsorber of an adsorption type refrigerator or a heat pipe. In an embodiment of the aluminum heat exchanger of the present invention, the film can be made of a silicate ($SiO_2$) film. Moreover, in an embodiment of the aluminum heat exchanger of the present invention, the thickness of the silicate film is preferably about 5 $\mu$m or less.

Furthermore, in an embodiment of the aluminum heat exchanger of the present invention, a chemical conversion film, such as an anodic oxide coating film can be used.

In an embodiment of the aluminum heat exchanger of the present invention, at least one of $PO_4^{3-}$, $SiO_3^{2-}$ or $SO_4^{2-}$ of several ppm to a hundred and several tens ppm is preferably used as the inorganic oxide negative ions to be added to the water.

The present invention may be more fully understood from the description of preferred embodiments thereof, as set forth below, together with the accompanying drawings.

BRIEF DESCRIPTION OF THE DRAWINGS

In the drawings:

FIG. 2 is a sectional view of an adsorber for an adsorption type refrigerator of an embodiment of the present invention.

FIG. 3 is a graph showing the amount of hydrogen generated when an $SiO_2$ film is provided on a surface of an aluminum heat exchanger in an adsorber.

FIG. 5 is a graph showing the amount of hydrogen generated when negative ions are added to the water.

FIG. 6 is a graph showing the amount of hydrogen generated in water vapor.

FIG. 7 is a graph showing the amount of hydrogen generated when an $SiO_2$ film is provided on a surface of an aluminum heat exchanger of the present invention and negative ions are added to the water.

DESCRIPTION OF THE PREFERRED EMBODIMENTS

Figure 1A:
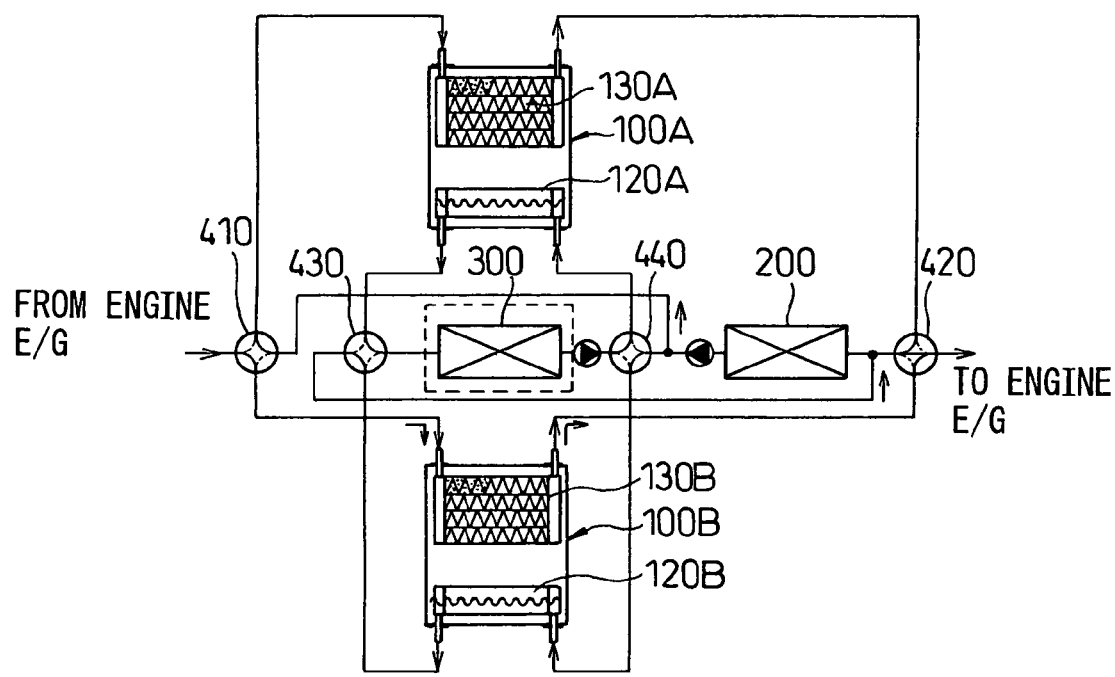
FIG. 1A is a schematic view of an adsorber for an adsorption type refrigerator, applied to an adsorption type air conditioner, according to the present invention

Embodiments of the present invention, in which an aluminum heat exchanger is used as an adsorber for an adsorption type refrigerator, will be explained below with reference to the drawings. FIG. 1 schematically shows an aluminum heat exchanger of the present invention, applied to an adsorption type air conditioner. In FIG. 1A, numeral 100 represents an adsorber in this embodiment. At least two adsorbers 100 are provided, of which the upper adsorber 100 in the drawing is a first adsorber 100A and the lower adsorber 100 is a second adsorber 100B. Likewise, first and second heat exchangers 120, 130 in the first adsorber 100A are indicated by 120A and a 130A, respectively, and first and second heat exchangers 120, 130 in the second adsorber 100B are indicated by 120B and 130B, respectively.

Numeral 200 represents an external heat exchanger which performs a heat exchange between a heat medium (in this embodiment, fluid comprising water and an ethylene glycol-based antifreeze, which is the same as a coolant for an engine) circulated in the adsorber 100 and the outside air. Numeral 300 represents an internal heat exchanger to perform a heat exchange between a heat medium cooled by a refrigerating power generated in the adsorber 100 and the air (air-conditioner air) blown into a room to thereby cool the air.

Figure 1B:
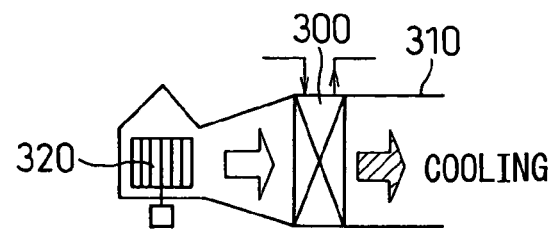
FIG. 1B is a schematic view of a casing of an air conditioner.

The internal heat exchanger 300 is arranged in an air conditioner casing 310 which defines an air path of the air conditioner air as shown in FIG. 1B, and a centrifugal blower 320, for example, is arranged on the upstream side of the air flow in the air conditioner casing 310.

In the present embodiment, regeneration of the adsorbent is carried out by circulating cooling water (the same fluid as the heat medium) for a water-cooled engine into the adsorber 100 (the second heat exchanger 130 which will be discussed hereinafter). Numerals 410–440 represent switching valves (four-way valves) to change the circulation path of the heat medium.

Next, the adsorber 100 will be described. As shown in FIG. 2, the adsorber 100 is comprised of a stainless steel (SUS304) casing 110 which substantially contains a vacuum and in which a refrigerant (water in this embodiment) is enclosed, a first heat exchanger (vaporizing/condensing core) 120 to perform a heat exchange between the heat medium and the refrigerant (water) in the casing 110, and a second heat exchanger (adsorption core) 130 to cool or heat an adsorbent 135, for example, silica gel, zeolite, activated carbon, activated alumina, and the like.

The heat exchangers 120, 130 are contained in the casing 110 and are comprised of aluminum tubes 121, 131 and aluminum fins 122, 132. The adsorbent 135 is immovably adhered by an adhesive to the surfaces of the tubes 131 and the fins 132 of the second heat exchanger (adsorption core) 130 as shown in FIG. 2. The tubes 121, 131 are flat pipes in which the heat medium flows, and the fins 122, 132 are corrugated fins which are shaped so as to increase the outer surface area to thereby enhance the heat exchangeability.

Numeral 123, 133 are aluminum pipes which are connected to the first and the second heat exchangers 120, 130 and extend through the casing 110. The heat medium is introduced through the pipes 123, 133 in the adsorber 100 (first and second heat exchangers 120, 130).

Films which do not permit moisture to pass therethrough, such as silicate ($SiO_2$) films, anodic oxide films, or boehmite films, are provided on the outer surfaces of the heat exchangers 120, 130. For the $SiO_2$ treatment solution to form the $SiO_2$ film, it is desirable to use (1) a treatment solution which is ceramicized (hardened) when heated and dried at high temperature (not less than 450° C.), or (2) a treatment solution which is ceramicized to form an inorganic film due to a catalytic reaction at the ambient temperature (about 25° C.) to a temperature below a low temperature (about 200° C.). In this connection, whichever of the $SiO_2$ treatment solutions is used, an $SiO_2$ treatment solution having alcohol solvent is preferable, because it exhibits good wettability to the surfaces of the heat exchangers 120, 130, and thus, the $SiO_2$ treatment solution can be uniformly applied to the aluminum surface by dipping or painting.

In this case, the thickness of the $SiO_2$ film is not greater than 5 µm, and preferably about 2–3 µm, to prevent occurrence of a crack when the film is formed, and in view of a filliability of the adsorbent 135 in the second heat exchanger (adsorption core) 130.

Furthermore, in the present invention, as the above films can remarkably reduce corrosion of the aluminum but cannot be perfectly free from any flaw, several ppm to a hundred and several tens ppm of negative ions of inorganic oxide such as $PO_4^{3-}$ or $SiO_3^{3-}$ are added, solely or in combination to the refrigerant (water in this embodiment) in the adsorber 100.

Next, the general operation of the adsorption type air conditioner will be explained.

The switching valves 410–440 are switched as indicated by solid lines in FIG. 1A to circulate the heat medium between the first heat exchanger 120A of the first adsorber 100A and the internal heat exchanger 300, between the second heat exchanger 130A of the first adsorber 100A and the external heat exchanger 200, between the first heat exchanger 120B of the second adsorber 120B and the external heat exchanger 200, and between the second heat exchanger 130B of the second adsorber 100B and the engine.

Consequently, the first adsorber 100A is in an adsorption process and the second adsorber 100B is in a desorption process, and the air is cooled due to the refrigerating power generated in the first adsorber 100A and the adsorbent 135 is regenerated in the second adsorber 100B.

Namely, in this state (referred to as a first status hereinafter), the first heat exchanger 120A of the first adsorber 100A functions as an evaporator which produces a refrigerating power by evaporating the liquid-phase refrigerant, the second heat exchanger 120A of the first adsorber 100A functions as a cooler which cools the adsorbent 135, the first heat exchanger 120A of the second adsorber 100B functions as a condenser which cools the water vapor desorbed from the adsorbent 135, and the second heat exchanger 130B of the second adsorber 100B functions as a heater which heats the adsorbent 135.

After the lapse of a predetermined time, for example, 60 seconds to 100 seconds, in the first status, the switching valves 410–440 are switched as indicated by dotted lines in FIG. 1A to circulate the heat medium between the first heat exchanger 120B of the second adsorber 100B and the internal heat exchanger 300, between the second heat exchanger 130B of the second adsorber 100B and the external heat exchanger 200, between the first heat exchanger 120A of the first adsorber 100A and the external heat exchanger 200, and between the second heat exchanger 130A of the first adsorber 100A and the engine.

Consequently, the second adsorber 100B is in the adsorption process, and the first adsorber 100A is in the desorption process, and the air is cooled due to the refrigerating power generated in the second adsorber 100B and the adsorbent 135 is regenerated in the first adsorber 100A.

Namely, in this state (referred to as a second status hereinafter), the first heat exchanger 120B of the second adsorber 100B functions as an evaporator which generates a refrigerating power by evaporating the liquid-phase refrigerant, the second heat exchanger 130B of the second adsorber 100B functions as a cooler which cools the adsorbent 135, the first heat exchanger 120A of the first adsorber 100A functions as a condenser which cools the water vapor desorbed from the adsorbent 135, and the second heat exchanger 130A of the first adsorber 100A functions as a heater which heats the adsorbent 135.

After a predetermined period of time in the second status, the switching valves 410–440 are switched to the first status. As described above, the first status and the second status are alternately repeated at predetermined time intervals to continuously operate the adsorption type air conditioner.

Next, the features of the embodiment will be explained.

In the present invention, the water non-permeable films are provided on the outer surfaces of the aluminum heat exchangers 120, 130, and inorganic oxide negative ions such as $PO_4^{3-}$ or $SiO_3^{3-}$ are added, at a density of several ppm to a hundred and several tens ppm, to the refrigerant (water) in the adsorber 100. The aluminum heat exchangers 120, 130 arranged in the adsorber 100, as shown in FIG. 2, have (1) a portion which is always in contact with the liquid refrigerant (water), (2) a portion which in always in contact with the vaporized refrigerant (water vapor), and (3) a portion which is periodically and alternately contacted by the liquid refrigerant (water) and the evaporated refrigerant (water vapor).

First, no aluminum (Al) is released from the portion (2) of the aluminum heat exchanger 130 contacting with the water vapor. Accordingly, no hydrogen is generated. This is apparent from FIG. 6. FIG. 6 is a graph showing the amount of hydrogen generated in the water vapor, in which the ordinate represents the partial pressure of the generated hydrogen (Torr) and the abscissa represents the time (hr). The partial pressure of the generated hydrogen is almost zero after the lapse of 1000 hours at the temperature of 90° C, and this means no hydrogen is generated.

Next, the hydrogen generated from the portion (3) of the aluminum heat exchangers 120, 130 with which the water and the water vapor are alternately in contact, is less than that in continuous contact with the water and thus, the anti-corrosion environment is better. If the film is provided on the aluminum surface, the corrosion does not begin immediately if the water is applied thereto. When the water passes through the film for some reasons and reaches the aluminum body, the corrosion begins. The reaching time varies depending on the kind or thickness of the film, or the size of the flaws or the temperature but the time is considerably long. Accordingly, if the vapor environment is established before the water applied to the surface reaches the aluminum surface, no aluminum is separated, and hence, no hydrogen is generated.

Figure 4:
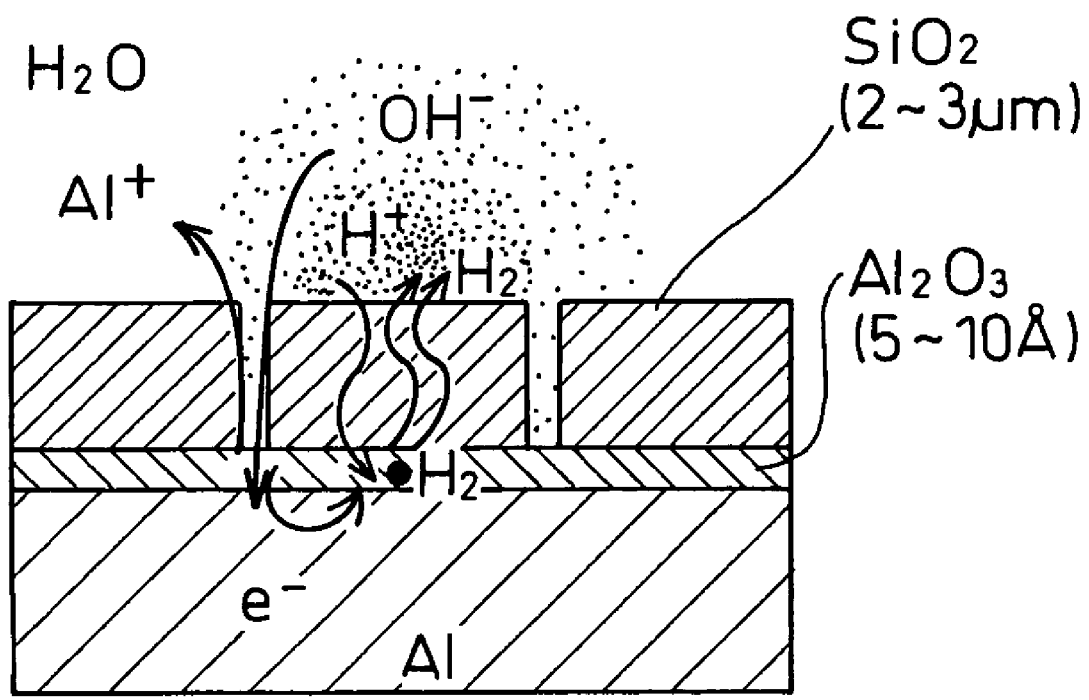
FIG. 4 illustrates a corrosion status in the water.

In case of the portion (1) in which the aluminum heat exchanger 120 is always in contact with the water, even if the film is coated on the aluminum surface, the water can reach the aluminum surface over time if there is a flaw. Consequently, aluminum (Al) is separated and hydrogen is generated. FIG. 4 shows occurrence of corrosion in the water, in which the water reaches the aluminum surface through the flaws of the $Al_2O_3$ film (anodic oxide coating film) and the $SiO_2$ film so that aluminum is separated as $Al^+$ ions and thus hydrogen $H_2$ is generated. FIG. 3 is a graph showing the amount of the hydrogen generated on the $SiO_2$ film, in which the ordinate represents the partial pressure of the generated hydrogen (Torr) and the abscissa represents the time (hr). Namely, in the aluminum heat exchanger provided with the $SiO_2$ film, the partial pressure of the generated hydrogen begins to increase (hydrogen is generated) after the lapse of 700 hours, at the temperature of 90° C.

However, as in the present invention, if there are inorganic oxide negative ions at a density of several ppm to a hundred and several tens ppm in the water (refrigerant), the negative ions are adsorbed by the aluminum body of the flaw portions of the film to repair the flaws. FIG. 5 is a graph showing the amount of hydrogen generated when negative ions are added to the water in the case that no film is provided on the surface of the aluminum heat exchanger, and FIG. 7 is a graph showing the amount of the hydrogen generated when negative ions are added to the water in the case that the film is provided on the surface of the aluminum heat exchanger. In each graph, the ordinate represents the partial pressure of the generated hydrogen (Torr) and the abscissa represents the time (hr). The test conditions are such that the temperature is 40° C., and 500 ppm of $PO_4$ and 40 ppm of $SiO_3$ are added as negative ions to the water. As can be seen from FIGS. 5 and 7, if no film is provided, the partial pressure of the generated hydrogen tends to increase immediately after the operation begins and the amount of hydrogen generated is gradually increased. However, if the film is provided, an increase in the partial pressure of the generated hydrogen hardly occurs and the partial pressure remains almost zero even after the lapse of 1000 hours. It can be seen that no hydrogen is generated.

Figure 8A:
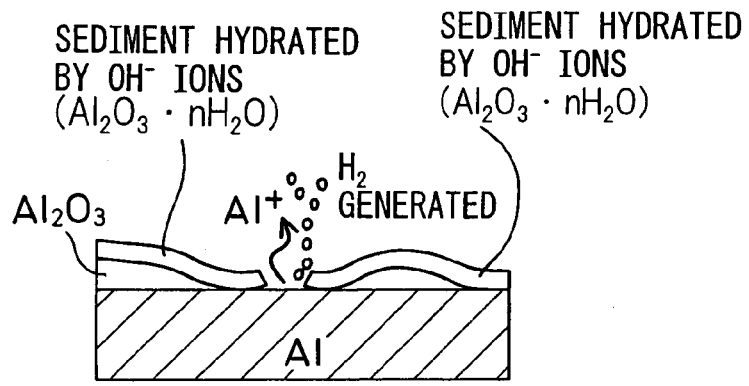
FIGS. 8A and 8B illustrate a mechanism to restrict generation of hydrogen.

FIG. 8 shows a hypothetical mechanism to restrict the generation of the hydrogen. A natural oxide film ($Al_2O_3$) is formed on an aluminum surface. Sediment ($Al_2O_3/nH_2O$) hydrated by $OH^-$ ions in the water is formed on the natural oxide film ($Al_2O_3$) when dipped in the water. The aluminum (Al) is separated as $Al^+$ ions from the surface portion where the oxide film ($Al_2O_3$) is thin (for example, a film flaw).

Figure 8B:
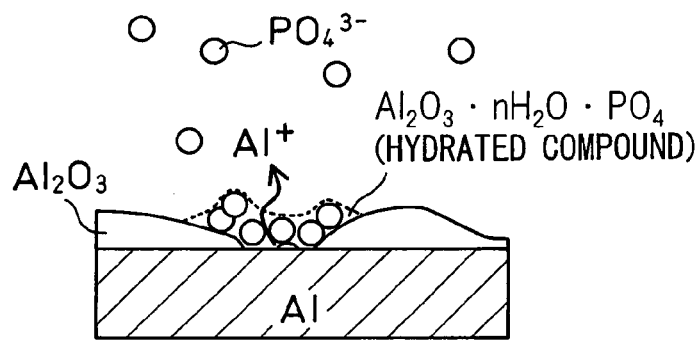

However, it is considered that if there are negative ions ($PO_4^{3-}$) in the water, the $Al^+$ ions separated from the film flaw portions and negative ions ($PO_4^{3-}$) are attracted (adsorbed) each other as shown in FIG. 8B so that hydrated compound ($Al_2O_3/nH_2O/PO_4$) is produced at the flaw, and thus generation of the hydrogen is restricted.

Regarding the remaining negative ions $SiO_3^{2-}$ and $SO_4^{2-}$, it can be considered that generation of the hydrogen is restricted by the same mechanism. In this case, the inorganic oxide ions can be advantageously used as negative ions which function as a corrosion inhibitor of the aluminum.

In a preferable embodiment of the present invention, the thickness of the $SiO_2$ film is about 2–3 $\mu$m and $PO_4^{3-}$ ions at 150 ppm and $SiO_3^{2-}$ ions at 40 ppm are added in the water in the adsorber, but the present invention is not limited to these values.

Figure 9:
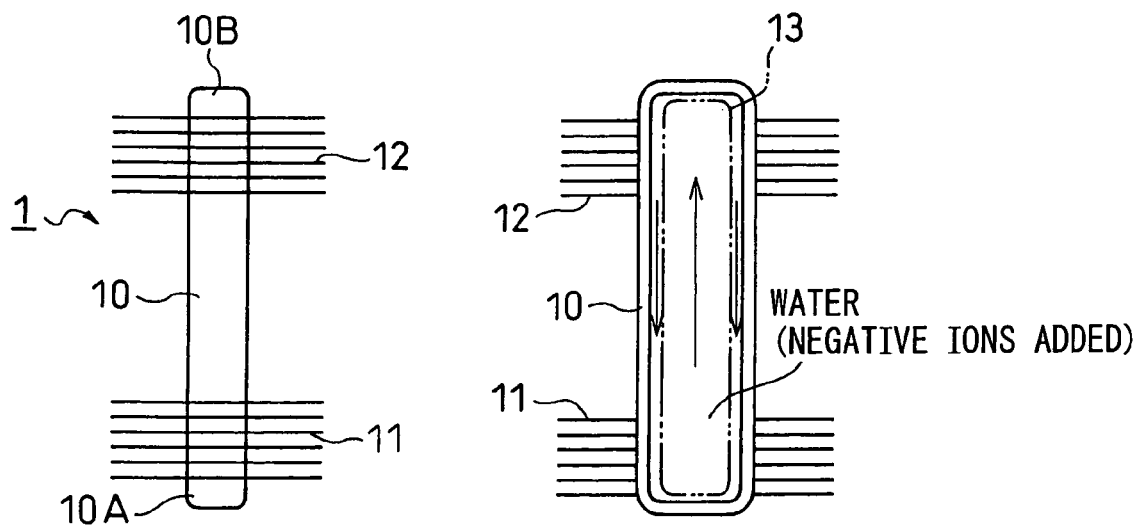
FIG. 9 shows a front view and a longitudinal sectional view of another embodiment in which an aluminum heat exchanger of the present invention is used as a heat pipe.

Next, another embodiment in which the aluminum heat exchanger of the present invention is used as a heat pipe will be explained. FIG. 9 shows a front view and a longitudinal sectional view of the heat pipe. The heat pipe 1 is generally made of a hollow closed body 10 having an endothermic portion (heating portion) 10A and a heat radiating portion 10B, and the refrigerant 10 is enclosed in the closed body 10. Endothermic fins 11 can be provided at the endothermic portion 10A and heat radiating fins 12 can be provided at the heat radiating portion 10B in accordance with need. The heat pipe 1 of the present invention is made of aluminum, in which a protection film 13, which does not permit water to pass therethrough, such as a silicate ($SiO_2$) film, an anodic oxide coating ($Al_2O_3$) film or a boehmite film, is provided on the inner wall of the closed body 10 and the water is enclosed as the refrigerant in the heat pipe. Negative ions $PO_4^{3-}$, $SiO_3^{2-}$ and $SO_4^{2-}$ are added to the water at the density of several ppm and a hundred and several tens ppm.

In the heat pipe 1, the heat is absorbed in the endothermic portion 10A from the heating body 2 to evaporate the water in the closed body 10. The evaporated water moves up to the heat radiating portion 10B and radiates the heat and is condensed. The condensed water moves down and returned to the endothermic portion 10A. As described above, the heat exchange is carried out by circulating the water, as the refrigerant, in the closed body 10 while changing its phase.

A wick layer (not shown) made of a porous material can be provided on the protection film 13 of the inner wall of the closed body 10 to circulate the refrigerant due to a capillary action.

As described above, in the heat pipe 1 of this embodiment, as the water non-permeable protection film 13 is provided on the aluminum surface and negative ions are added to the water, as in the adsorber 10, the generation of the hydrogen is restricted if there are flaws in a part of the protection film, because hydrated compound is produced by the negative ions at the flaw portions.

Figure 10A:
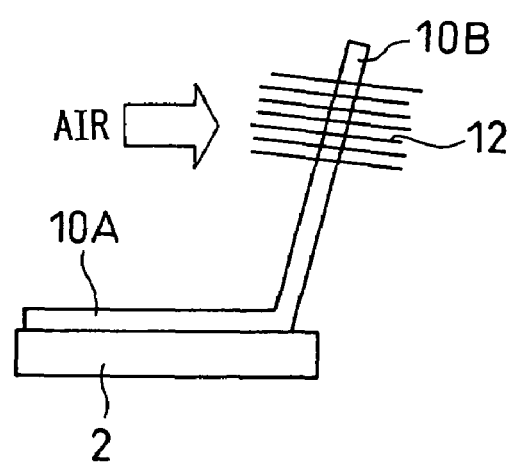
FIGS. 10A and 10B are concrete examples of a heat pipe of the present invention.
Figure 10B:
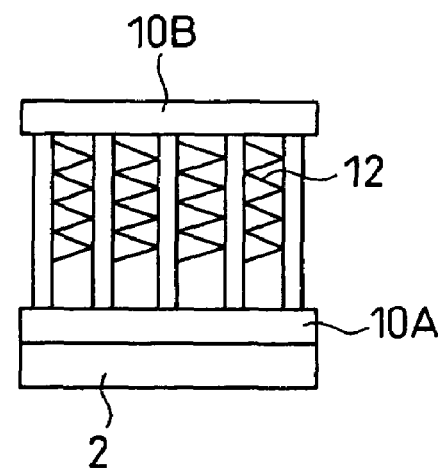

FIGS. 10A, 10B shows concrete examples of the heat pipe 1 of the present invention. Namely, in FIG. 10A, the closed body of the heat pipe 1 is bent in an L-shape and the endothermic portion 10A is attached to the heat generating body 2 such as a CPU in contact therewith. The heat radiating fins 12 are provided on the heat radiating portion 10B remote from the heating body 2, and the heat radiating portion 10B is cooled by the ambient air. Accordingly, the heat from the heating body 2 is absorbed by the water in the endothermic portion 10A and the water is evaporated and moved to the heat radiating portion 10B from the endothermic portion 10A. The water evaporated at the heat radiating portion 10B is cooled by the ambient air and is condensed into water, and the water is returned to the endothermic portion 10A. Thus, the heating body 2 is cooled.

In the heat pipe 1 shown in FIG. 10B, several hollow members are provided between the endothermic portion 10A and the heat radiating portion 10B, and corrugated heat radiating fins 12 are provided between the hollow members on the heat radiating portion 10B side. The endothermic portion 10A is attached in contact with the heat generating body 2 such as a CPU, and the heat radiating portion 10B is arranged remote from the heat generating body 2 and is cooled by the ambient air. The heat radiating (cooling) function of the heat generating body 2 is the same as that of the heat pipe 1 shown in FIG. 10A.

As described above, in the present invention, the aluminum heat exchanger is provided with a film and negative ions are added to the water (refrigerant), so that the negative ions function to repair the flaws of the film and, therefore, no inspection to check the flaws of the film is necessary.

While the invention has been described by reference to specific embodiments chosen for purposes of illustration, it should be apparent that numerous modifications could be made thereto, by those skilled in the art, without departing from the basic concept and scope of the invention.

What is claimed is:

1. An aluminum heat exchanger in an environment in which water and aluminum exist in a sealed casing having no air therein and evaporation and condensation take place at a surface of the aluminum, wherein a film which does not permit moisture to pass therethrough is provided on the aluminum surface and negative ions of inorganic oxides of several ppm to a hundred and several tens ppm are added, solely or in combination, in the water enclosed in the casing.

2. An aluminum heat exchanger according to claim 1, in which said aluminum heat exchanger is an adsorber for an adsorption type refrigerator or a heat pipe.

3. An aluminum heat exchanger according to claim 1, in which said film is a silicate oxide ($SiO_2$)film.

4. An aluminum heat exchanger according to claim 3, in which said silicate oxide ($SiO_2$)film has a thickness of approximately 5 $\mu$m or less.

5. An aluminum heat exchanger according to claim 1, in which said film is a chemical conversion film, such as an anodic oxide coating film or a boehmite film.

6. An aluminum heat exchanger according to claim 1, in which said inorganic oxide negative ions are at least one of $PO_4^{3-}$, $SiO_3^{2-}$, or $SO_4^{2-}$ and several ppm to a hundred and several tens of ppm thereof are added.

* * * * *

UNITED STATES PATENT AND TRADEMARK OFFICE
CERTIFICATE OF CORRECTION

PATENT NO.      : 6,994,154 B2                               Page 1 of 1
APPLICATION NO. : 10/819239
DATED           : February 7, 2006
INVENTOR(S)     : Hisao Nagashima et al.

It is certified that error appears in the above-identified patent and that said Letters Patent is hereby corrected as shown below:

Title Page, add Foreign Application Priority Data:

Apr. 11, 2003  (JP)  2003-107848
    Feb. 12, 2004  (JP)  2004-034623

Signed and Sealed this

First Day of August, 2006

JON W. DUDAS
*Director of the United States Patent and Trademark Office*